United States Patent [19]

Mollet et al.

[11] 4,110,073

[45] Aug. 29, 1978

[54] FLUID AND STABLE DISPERSIONS OF ANIONIC DYESTUFFS

[75] Inventors: Hans Mollet, Reinach; Wolfgang Rehmann, Basel, both of Switzerland

[73] Assignee: Ciba-Geigy AG, Switzerland

[21] Appl. No.: 684,736

[22] Filed: May 10, 1976

[60] Continuation of Ser. No. 441,625, Feb. 11, 1974, abandoned. Which is a continuation of Ser. No. 285,666, Sep. 1, 1972, abandoned.

[30] Foreign Application Priority Data

Sep. 10, 1971 [CH] Switzerland .......................... 013314

[51] Int. Cl.² ...................... C09B 67/00; D06P 1/645
[52] U.S. Cl. ......................................... 8/85 R; 8/39 R; 8/41 R; 8/42 R; 8/54; 8/89 R; 8/92; 8/178 R
[58] Field of Search .................... 8/39, 41 R, 173, 79, 8/89 R, 92, 85 R

[56] References Cited

U.S. PATENT DOCUMENTS

| 2,999,731 | 9/1961 | Harding | 8/54 |
| 3,546,197 | 12/1970 | Benko | 260/124 |

FOREIGN PATENT DOCUMENTS 1,001,182 8/1965 United Kingdom.

OTHER PUBLICATIONS

Bird, "The Theory and Practice of Wool Dyeing", (Soc. Dyers and Colourists, 1963), 3rd edition, p. 181.

*Primary Examiner*—A. Lionel Clingman
*Attorney, Agent, or Firm*—Wenderoth, Lind & Ponack

[57] ABSTRACT

The present invention concerns new fluid and stable dispersions of anionic dyestuffs, containing
(a) dispersed anionic dyestuff with a maximum particle size of 5μ,
(b) a dispersing agent which comprises
  (i) a combination of at least two different anion-active dispersing agents or
  (ii) a combination of an anion-active dispersing agent and at least one wetting agent or
  (iii) a combination of at least two different anion-active dispersing agents and at least one wetting agent,
(c) optionally further auxiliaries and
(d) water,
as well as a process for their production and their application to dyeing and printing of organic material, in particular fibre material of natural and synthetic polyamide.

7 Claims, No Drawings

FLUID AND STABLE DISPERSIONS OF ANIONIC DYESTUFFS

This application is a continuation of application Ser. No. 441,625, filed Feb. 11, 1974, (now abandoned) which application is in turn a continuation of application Ser. No. 285,666, filed Sept. 1, 1972 (now abandoned).

The present invention relates to new fluid and stable dispersions of anionic dyestuffs, to a process for their production, and also to their use for the dyeing and the printing of organic material, particularly of fibre material made from natural and from synthetic polyamide.

Most textile dyestuffs are sold commercially in the form of finely ground powders which, to a greater or lesser extent, give off dust. The handling of such dusty powders leads to an undesirable contamination of the environment and of the personnel working with the powders. This factor necessitates the installation of suitable protective equipment such as, for example, ventilation appliances. Contamination of the atmosphere with dyestuff particles can lead to staining of other colourable materials, thus rendering useless, for example, colourless textiles or textiles dyed in a single shade. Moreover, very finely ground dyestuffs readily become lumpy on storage in a moist atmosphere.

Processes have therefore long been known which are aimed at preventing the creation of dust upon handling of dyestuff powders. The most frequent proposal in practice is the admixture of wetting oils or of appreciable amounts of hygroscopic liquids, such as glycerin to dyestuff powders. These methods are unsatisfactory, however, since, particularly in the case of very dusty powders, the amount of dust given off while reduced is in no way eliminated and lump formation is not avoided. The same applies to the method of merely moistening the dyestuff powders with water. Similarly, the recently utilized technique of wetting the powder with a combination of a polyvalent aliphatic alcohol having hygroscopic properties and water affords unsatisfactory results. Wetting the dyestuff powder with sulphonated oils and subsequently thickening by the removal of air is complicated and requires special equipment, since subsequent concentration of the powders is effected under vacuum. Finally, the likewise known agglomeration of the particles of powder by moistening with steam in a zone of turbulence leads only to a reduction, but not to a prevention, of the creation of dust.

Furthermore, pulverulent anionic dyestuffs form lumps when water is added or when they are introduced into water, since they are not easily wetted. The preparation of dye liquors is consequently rendered difficult, and is frequently very time-consuming.

Moreover, the preparation of aqueous dispersions of water-insoluble pigments, or of difficultly water-soluble dispersion dyestuffs, has already been recommended. The purpose of this measure is not only, however, to prevent dust being given off from the dyestuffs concerned, but also to relieve the dyer in these dyeing processes of the critical task of preparing the dispersions.

With regard, however, to the preparation of stable aqueous dispersions of anionic dyestuffs, such as are represented by, in particular, the 2:1 metal-complex dyestuffs, especially chromium-complex dyestuffs, or by the acid wool dyestuffs, it was believed that, because of the solubility of the dyestuffs in water, there occurs a recrystallization of the dispersions, which implies that such dispersions are not stable. In the Swiss Pat. No. 498,242 it is stated, inter alia: "...and particularly in the case of dyestuffs which are slightly soluble in water it is extraordinarily difficult to attain the specific degree of fineness specially required for the continuous dyeing process, since there can occur, already during the grinding of the paste comprising water, dyestuff and dispersing agent a recrystallization which counteracts the necessary process of dispersion."

As a means of overcoming this difficulty the suggestion has been made in the Belgian Pat. No. 699,733 for example that the solubility of the dyestuff be suppressed by the addition of water-soluble salts to the point that a recrystallization of the dyestuff is prevented. The colloidal-chemical stability of the dispersion is, however, consequently reduced and unstable, flocculent dispersions are obtained.

Surprisingly, and contrary to the above mentioned conjectures, it has now been discovered that completely stable and fluid aqueous dispersions of anionic dyestuffs with a particle size of at most $5\mu$, can be produced upon utilization of anion-active dispersing agents, and optionally further auxiliaries. Such aqueous dispersions according to the invention exhibit no sedimentation and no increase in viscosity during storage periods of many months.

These fluid and stable dispersions according to the invention are characterized by a content of:
(a) a dispersed anionic dyestuff having a maximum particle size of $5\mu$,
(b) at least one anion-active dispersing agent and optionally wetting agents,
(c) optionally further auxiliaries, such as moisturizing and antisedimentation agents and/or bactericides, and
(d) water.

The viscosity of these dispersions preferably lies in the range of 3 to 500 centipoise.

By anionic dyestuffs is meant here dyestuffs of which the solubility in water at 20° C is at least 0.5%, i.e. 5 g/l. In this connection, the term 'solubility' does not denote the actual physical solubility of the dyestuff, but denotes the filter value usual in the dyeing field. [Solubility determination according to Capponi: "The determination of the solubility of dyestuffs" in Textilveredlung (Textile processing) 2 (1967) No. 1, pp. 13 to 16.]

Suitable anionic dyestuffs as mentioned above are both metalized and nonmetalized acid dyestuffs for wool as defined, for example, in the Colour Index, which may be either reactive or nonreactive. Particularly suitable dyestuffs for this purpose are, however, 1:1- or 1:2-metal-complex dyestuffs of o,o'-dihydroxy-, o-hydroxy-o'-carboxy- and o-hydroxy-o'-aminoazo dyestuffs, with the 1:2-metal-complexes, particularly chromium-complexes, of o,o'-dihydroxy- and o-hydroxy-o'-carboxy-azo-dyestuffs being of special importance. The anionic dyestuffs, optionally containing a fibre-reactive group, can moreover belong to the most diverse classes of dyestuffs, such as to the azo, anthraquinone or phthalocyanine dyestuff classes.

preferable dyestuffs are metal-containing anionic dyestuffs optionally having a fibre-reactive group, such as 1:1-nickel-, -cobalt-, -copper- or -chromium-complexes, and especially 1:2-cobalt- or -chromium-complexes, of azo dyestuffs, which each contain in the o-position with respect to the azo bridge a complex-bound group, derived from an amino, a carboxy or a hydroxy group, particularly 1:2-chromium complexes of o-carboxy-o'-hydroxy- or o,o'-dihydroxy-azo dyestuffs of the naphthalene-azonaphthalene, benzeneazonaphthalene, benzeneazopyrazole or benzeneazoacetoacetic acid-amide series, or metal complexes optionally containing a N-mono- or N,N-dialkyl substituted sulphonic acid amide group, or a low-molecular alkylsulphonyl group.

The proportion of dyestuff as defined which is present in the dispersions according to the invention is to be as high as possible, and amounts at least to about 10%, preferably 20 to 50%. The requirement with regard to the upper limit is that the preparations are still fluid.

Dispersions according to the invention also contain at least one anion-active dispersing agent, preferably, however, two different anion-active dispersing agents, or one or two anion-active dispersing agents, and a wetting agent.

The following are mentioned, for example, as anion-active dispersing agents applicable according to the invention:

(1) lignin sulphonates, such as sodium- or potassium-lignin sulphonate. The quality of the lignin sulphonates is significant for the attainment of stable fluid dispersions. Preferred are sodium salts, containing none or only very small quantities of sugars and which have a molecular weight of between 5000 and 50,000. Furthermore, the degree of sulphonation of the products, e.g., the number of sulphonic acid groups per 1000 molecular weight units, is critical. Preferred lignin sulphonates display a degree of sulphonation between 0.5 and 5. The viscose properties of the aqueous dyestuff dispersions are significantly affected by both these parameters.

(2) The sodium, potassium, ammonium, N-alkyl-, N-hydroxy-alkyl-, N-alkoxyalkyl- or N-cyclohexylammonium or hydrazinium and morpholinium salts of fatty acids having 10 to 20 carbon atoms, described as soaps, such as aluric, palmitic, stearic or oleic acid;

(3) Sulphated primary or secondary purely aliphatic alcohols of which the alkyl chain contains 8 to 18 carbon atoms, e.g. sodium lauryl sulphate, sodium-α-methylstearyl-sulphate, sodium tridecylsulphate, sodium oleylsulphate, potassium stearylsulphate, or the sodium salts of coconut oil fatty alcohol sulphates;

(4) sulphated, unsaturated higher fatty acids or fatty acid esters, such as oleic acid, elaidic acid or ricinoleic acid or lower alkyl esters thereof, e.g. ethyl, propyl or butyl esters, and the oils containing such fatty acids, such as olive oil, castor oil, rape oil, etc.

(5) sulphated ethylene oxide adducts, such as sulphated addition products of 1 to 10 moles of ethylene oxide with fatty acid amides, mercaptans or amines, particularly, however, with fatty acids, aliphatic alcohols or alkylphenols having 8 to 20 carbon atoms in the alkyl chain, e.g. with stearic acid, oleic acid, lauryl alcohol, myristyl alcohol, stearyl alcohol, oleyl alcohol, octylphenol or nonylphenol;

(6) sulphates of N-acylated alkanolamines, e.g. the sulphated amides of caprylic, pelargonic, capric, lauric, myristic or stearic acid, or of lower fatty acids substituted by alkylphenoxy groups, such as octyl- or nonylphenoxyacetic acid, with mono- or bis-hydroxyalkylamines, such as β-hydroxyethylamine, γ-hydroxypropylamine, β,γ-dihydroxypropylamine, bis-(β-hydroxyethyl)-amine, or with N-alkyl-N-hydroxyalkylamines such as N-methyl- or N-ethyl-N-(β-hydroxyethyl)-amine;

(7) sulphated esterified polyoxy compounds, e.g. sulphated partially esterified polyvalent alcohols, such as the sodium salt of the sulphated monoglyceride of palmitic acid; instead of sulphates, it is also possible to use esters with other polyvalent mineral acids, e.g. phosphates;

(8) primary and secondary alkylsulphonates of which the alkyl chain contains 10 to 20 carbon atoms, e.g. sodium dodecylsulphonate, sodium hexadecanesulphonate-8, sodium stearylsulphonate;

(9) alkylarylsulphonates, such as alkylbenzenesulphonates having a straight-chain or branched alkyl chain containing at least 7 carbon atoms, e.g. sodium dodecylbenzene-sulphonate, 1,3,5,7-tetramethyloctylbenzenesulphonate, sodium octadecylbenzenesulphonate such as alkylnaphthalenesulphonates, e.g. sodium-1-isopropylnaphthalene-2-sulphonate, sodium dibutylnaphthalenesulphonate;

(10) sulphonates of polycarboxylic acid esters, e.g. sodium dioctylsulphosuccinate, sodium dihexylsulphophthalate;

(11) condensation products of arylsulphonic acids with formaldehyde, such as dinaphthylmethanesulphonates, e.g. the sodium salt of di-(6-sulphonaphthyl-2)-methane, or condensation products of naphthalenedisulphonic acid with formaldehyde and cresol.

According to the invention, the previously-mentioned anion-active dispersing agents can also be used in admixture with non-ionic dispersing agents, as for example with (1) addition products of alkylene oxide, particularly of ethylene oxide, with higher fatty acids, fatty acid amides, aliphatic alcohols or mercaptans, with alkylphenols or alkylthiophenols of which the alkyl radicals contain at least 7 carbon atoms. Those preferred are polyglycolmonoalkylphenyl ethers having 2 to 20 optionally substituted glycol units of which the alkyl group contains 8 to 12 carbon atoms, such as tri-(1,2-propyleneglycol)-mononpnylphenyl ethers, pentaethylene glycol monooctylphenyl ethers or decaethylene glycol monononylphenyl ethers;

(2) esters of polyalcohols, particularly monoglycerides of fatty acids having 12 to 18 carbon atoms, e.g. the monoglycerides of lauric, stearic or oleic acid;

(3) N-acylated alkanolamines of the same type as mentioned in the case of the sulphates of these compounds; thus, for example, N,N-bis-(ω-hydroxyalkyl)-amides of the acid mixtures embraced by the collective term "coconut oil fatty acids", especially N,N-bis-(β-hydroxyethyl)- or N,N-bis-(γ-hydroxypropyl)-amides, also the addition products of ethylene oxide with these N-acylated alkanolamines;

(4) reaction products from higher fatty acids with an alkanolamine, with the molar ratio of alkanolamine to fatty acid being greater than 1, e.g. 2. Suitable fatty acids, are, in particular, those having 8 to 18 carbon atoms, such as the mixtures denoted by the term coconut oil fatty acids; suitable alkanolamines are especially diethanolamine. Such substances are described in the U.S. Pat. No. 2,089,212. These compounds are not homogeneous, and in some cases have a cation-active character.

With regard to the technically accessible dispersing agents of the mentioned classes, these are mostly not homogeneous products, but homologous mixtures of the stated compounds.

Anion-active dispersing agents are particularly preferred, such as sodium lignin sulphonates, and/or condensation products of arylsulphonic acids and formaldehyde, such as dinaphthylmethanedisulphonate, as well as sulphates of higher alkanols, or addition products of ethylene oxide with higher aliphatic alcohols, or alkylphenols and mixtures thereof. Especially effective are mixtures of disodium dinaphthylmethanedisulphonate and sodium ligninsulphonate.

The proportion of anion-active dispersing agent in the dispersions according to the invention amounts to ca. at least 5, but preferably 10 to 80, percent by weight, relative to the weight of dyestuff.

In many cases, the addition of wetting agents to the dispersions according to the invention is warrented. Particularly suited wetting agents, used preferably in amounts of up to 5%, relative to the total weight of the dispersion, are: dibutylnaphthalenesulphonate, dioctylsulphosuccinate and decyloxyacetic acid monoethanolamide $(C_{10}H_{20}-O-CH_2-CO-NH-CH_2CH_2OH)$. Especially effective are mixtures of sodium ligninsulphonate and decyloxyacetic acid monoethanolamide or of disodium dinaphthylmethanedisulphonate and sodium dioctylsulphosuccinate.

The stable dispersions according to the invention may contain as further auxiliaries in particular antisedimentation agents, such as alginates, locust bean flour, alkylcellulose, especially carboxymethylcellulose, or crystal gum; antifoaming agents such as, e.g. higher fatty alcohols, higher-molecular fatty acid esters, or silicone oils; or textile finishing agents, e.g. antistatic agents such as quaternary ammonium compounds or fatty acid condensation products; bactericides such as sodium pentachlorophenolate, as well as humecants such as glycerin or glycol.

In order to reduce evaporation and to ensure stability over storage periods of months it is especially advantageous if the dispersions according to the invention contain, as further auxiliaries, moisturizing agents in quantities of 3 to 30 percent by weight, relative to the total weight of the aqueous dispersion, antisedimentation agents and/or bactericides, each in quantities of 0.1 to 3 percent by weight, relative to the weight of the aqueous dispersion.

The dispersions according to the invention preferably contain 20 to 80, and in particular 40 to 70, percent by weight of water, relative to the weight of the aqueous dispersion.

The dispersions according to the invention are advantageously produced by the stirring of at least one anionic dyestuff, preferably in the form of a moist press cake, or as a powder, into the solution or suspension of the anion-active dispersing agent and optionally wetting agents and perhaps even further auxiliaries in water, at room temperature or at elevated temperatures preferably not exceeding 50° C, with the employment of mixing and dispersing equipment common in industrial practice, such as mixers, homogenising or kneading apparatus, e.g. high-speed stirrers, turbomixers or kneaders, particularly, however, Attritor mills and other high-speed sand mills and ball mills. The purpose of this equipment is to effect a reduction in particle size of dyestuff agglomerates and of crystals. The particle size of the anionic dyestuffs employed has to be reduced in this operation to the extent that the particles are maintained in suspension by virtue of the Brownian molecular movement. The flow limit, which is pushed up by the additives present, acts in the same direction as the reduction in particle size. It is advantageous in many cases not to stir in the main amount of dispersing agent until after homogenisation of the other components. The mixing operation is terminated as soon as complete homogenisation has been attained, which usually occurs after 4 to 6 hours.

The particle size of the dyestuffs of the finely ground dispersion should not exceed $5\mu$; preferably it is below $3\mu$, and especially below $1\mu$.

The fluid and storage-stable dispersions according to the invention can be stored over several months even at temperatures of 40° C, and do not undergo sedimentation. They are above all largely insensitive to temperature variations and the undissolved dyestuff therein dispersed does not normally settle out or, if this occurs, can be easily redispersed homogeneously by a simple stirring or shaking operation; furthermore, it shows no tendency to form crystals.

The dispersions according to the invention constitute ready-to-use dye preparations. Depending on the type of dyestuff employed, they can be used diluted with warm or cold water (advantageously in the ratio of at least 1:10) or in the undiluted state as a liquor for the dyeing and printing of organic materials, especially fibre material made from natural polyamide, such as wool and synthetic polyamide. By the stirring of the preparations into cold or warm water and addition of suitable thickening agents, stable dye liquors or dye pastes are obtained which are particularly suitable for use in continuous dyeing or printing processes.

The following examples illustrate the invention without, however, the invention being in any way limited by them.

EXAMPLE 1

An amount of 279 g of a dyestuff powder of the formula

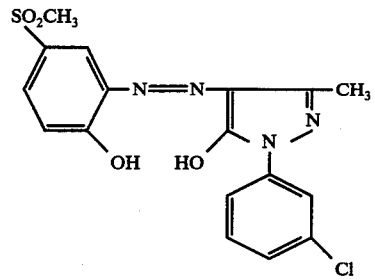

1:2 Cr-complex is added, with stirring, to a solution consisting of 335 g of water, 28 g of a lignin sulphonate and 28 g of dinaphthylmethanedisulphonate, and the resulting suspension is well homogenised. With the aid of a sand or glass-ball mill, the mixture is ground and dispersed until the particle size of the dyestuff is below 3 microns. The main portion of the dyestuff, i.e. above 80%, possesses a particle size of below 1 micron. Additions are subsequently made to the above thinly fluid aqueous dispersion of the following constituents: 47 g of glycerin, 3 g of sodium pentachlorophenolate, 10 g of carboxymethylcellulose, as well as 6 g of dibutylnaphthalenesulphonate and 386 g of water; the dispersion is then thoroughly homogenised.

The dyestuff dispersion produced in this manner is thinly fluid, storage-stable and free of sedimentation after storage for months. It is immediately ready for use, and can be used directly for the production of dye baths without intermediate dilution. It has a high filterability of 100 g/l - determined by the method of Capponi, Textilveredlung (Textile finishing) 2 (1967) No. 1, pp. 13 to 16 - and upon dilution is suitable for the usual dyeing processes for wool and polyamide, also therefore for printing, and can moreover be employed in leather dyeing. In the dyeing of cheeses there occurs no filtration and no contamination of the apparatus.

The viscosity of the dispersion is as follows:
$\eta c$ = 1.26 poises (Casson's flow behaviour),
$fc$ = 14.2 dyn/cm² (flow limit),
After 6 months' storage at room temperature:
$\eta c$ = 1.22 poises,
$fc$ = 14.2 dyn/cm².
No sediment is observed even after this period of time.

EXAMPLE 2

An amount of 309 g of a dyestuff of the formula

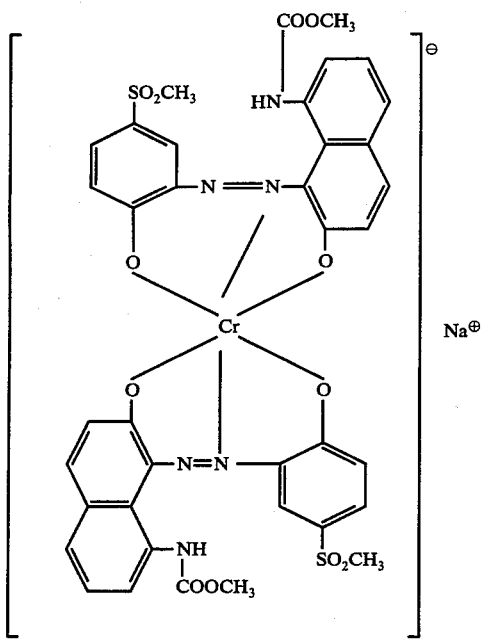

is added, with stirring, to a solution of 31 g of lignin sulphonate and 31 g of dinaphthylmethanedisulphonate in 371 g of water, and the resulting suspension is well homogenised. With the aid of a high-speed sand or glass-ball mill, grinding is carried out until all dyestuff particles have a particle size of below 3 microns, with the main proportion being below 1 micron. The following additions are made to this thinly-fluid dispersion: 51.5 g of glycerin, 6 g of dibutylnaphthalenesulphonate, 3 g of sodium pentachlorophenolate and 320 g of water. After the mixture has been well homogenised, a thinly fluid, stable dispersion is obtained. Even after 6 months storage at room temperature, the viscosity of this dispersion exhibits no appreciable change with regard to flow behaviour:
The viscosity is
$\eta c$ viscosity according to Casson = 8.85 centipoises,
$fc$ flow limit = 3.34 dyn/cm².
and after 6 months storage at room temperature
$\eta$ viscosity according to Casson = 10.32 centipoises,
$fc$ flow limit = 3.03 dyn/cm².
No sediment is observed even after this period of time.

A fluid, stable dispersion with similar properties is obtained if 309 g of the dyestuff of the above formula is slurried with 371 g of water in which 62 g of sodium lignin sulphonate are dissolved. This suspension is well homogenised and predispersed with the aid of a high-speed stirrer. Subsequently, the actual dispersing is carried out in a sand or glass bead mill, until the dyestuff particles display a particle size under 3 microns, and the major portion of the particles lies under 1 micron. To this dispersion are admixed 51.5 g glycerin, 3 g sodium pentachlorophenolate and 320 g water. The dispersion is rehomogenized and is then passed through a 20 micron nylon screen.

EXAMPLE 3

If the following constituents are used: 200 g of the dyestuff of the formula

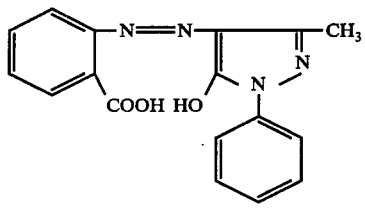

1:2 Cr-complex 200 g of water, 20 g of sodium lignin sulphonate, 20 g of dinaphthylmethanedisulphonate, 40 g of glycerin, 3 g of dibutylnaphthalenesulphonate, 2 g of sodium pentachlorophenolate and 115 g of water, with otherwise the same procedure as in Example 1, then fluid stable dispersions with similar good properties are obtained.

EXAMPLE 4

If the procedure as described in Example 2 is applied, with the employment in this case, however, of 430 g of the dyestuff of the formula

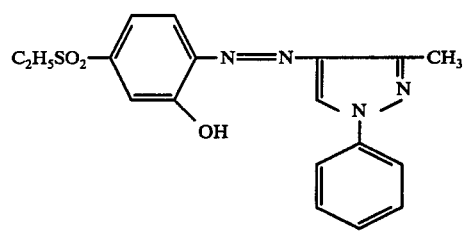

1:2 Cr-complex 43 g of sodium lignin sulphonate, 43 g of dinaphthylmethanedisulphonate, 86 g of glycerin, 12 g of dibutylnaphthalenesulphonate, 6 g of sodium pentachlorophenolate and 1380 g of water, then fluid dyestuff dispersions with similar good properties are obtained.

EXAMPLE 5

An amount of 133.3 g of sodium lignin sulphonate is dissolved, with stirring, in 358.8 g of water, and 333.3 g of the blue dyestuff of the formula

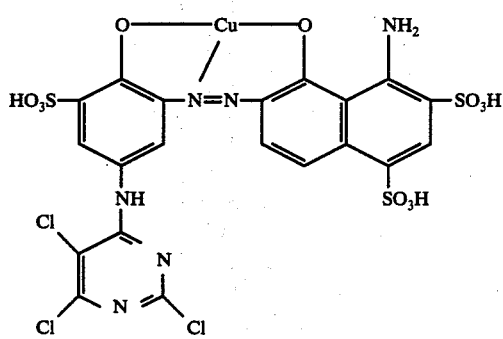

stirred into the solution; the mixture is then homogenised. The resulting pasty mixture is thereupon ground in a glass-ball mill until the particle size of the dyestuff is below 3 microns. The following constituents are then mixed in: 66.6 g of glycerin, 5 g of dibutylnaphthalenesulphonate and 3 g of sodium pentachlorophenolate.

There is thus obtained an amount of 900 g of a finely dispersed, thinly fluid and stable dispersion free of sedimentation, the said dispersion being suitable upon dilution for the dyeing of cellulose fibres by the padding and exhaust processes.

Fluid, stable dispersions with like properties are obtained if, instead of the components given in Example 1, the components entered in the following table are used, the procedure being otherwise as described in Example 1.

TABLE

| Ex. | | | |
|---|---|---|---|
| 6 | Dyestuff | 204 g | [structure] |
| | Dispersing agent | 81 g | sodium ligninsulphonate |
| | Wetting agent | 2 g | decyloxyacetic acid monoethanolamide |
| | Bactericide | 3 g | sodiumpentachlorophenolate |
| | Glycerine | 41 g | |
| | Water | 669 g | |
| 7 | Dyestuff | 312 g | [structure] |
| | Dispersing agent | 125 g | sodium ligninsulphonate |
| | Wetting agent | — | |
| | Bactericide | 3 g | sodiumpentachlorophenolate |
| | Glycerine | 62 g | |
| | Water | 498 g | |
| 8 | Dyestuff | 357 g | [structure] |
| | Dispersing agent | 143 g | dinaphthylmethandisulphonate |
| | Wetting agent | 4 g | sodiumdioctylsulphosuccinate |
| | Bactericide | 3 g | sodiumpentachlorophenolate |
| | Glycerine | 71 g | |
| | Water | 422 g | |
| 9 | Dyestuff | 250 g | [structure] |
| | Dispersing agent | 100 g | dinaphthylmethanedisulphonate |
| | Wetting agent | — | |

| Ex. | | | |
|---|---|---|---|
| | Bactericide | 3 g | sodiumpentachlorophenolate |
| | Glycerine | 50 g | |
| | Water | 597 g | |

EXAMPLE 10

Amounts of 66.8 g of dinaphthylmethanedisulphonic acid and 66.8 g of sodium lignin sulphonate are dissolved, with stirring, in 350 g of water; and subsequently 232.7 g of the blue dyestuff of the formula

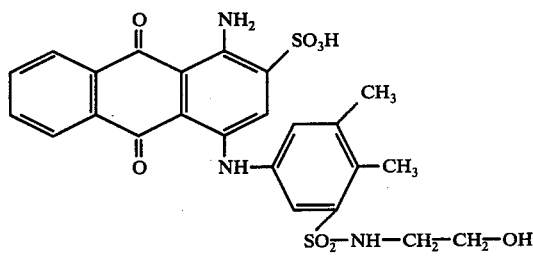

is stirred into the solution, and it is homogenised. The dispersion is thereupon ground in a glass-ball mill until the particle size of the dispersed dyestuff is below 3 microns. While stirring is maintained, the following additions are then made: 26.5 g of glycerin, 5 g of dibutylnaphthalenesulphonate, 3 g of sodium pentachlorophenolate and 249.1 g of water.

There is thus obtained 1000 g of a finely dispersed, thinly fluid and stable dispersion free of sedimentation, the said dispersion being suitable for the dyeing of polyamide by the conventional dyeing processes.

EXAMPLE 11

100 g of dry dyestuff of the formula

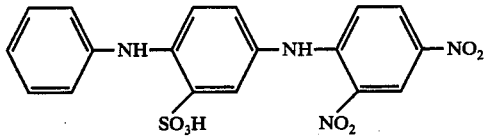

are slurried in 80 g of water, in which 20 g of sodium ligninsulphonate (sugar-free, fractionated) have been dissolved. After this suspension is well homogenised and predispersed with a dispersing stirrer, i.e. brought to a maximum particle size of about 20 microns, the actual dispersion takes place in a sand or glass bead mill. As soon as all dyestuff particles have a particle size of less than 3 microns, the dispersing is stopped. To the fluid batter are added 29 g of water, 20 g of glycerine, and 0.75 g of sodium pentachlorophenolate. It is well mixed and homogenised and decanted through a 20 micron screen.

EXAMPLE 12

To 630 g of filter cake containing 139 g of dyestuff of the formula

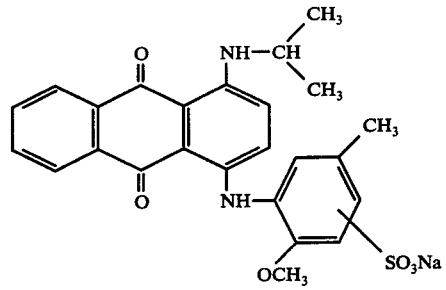

are added 34.8 g of dinaphthylmethanedisulphonate and 34.8 g of sodium lignin sulphonate and the mixture is liquified and homogenised by stirring. This slurry is ground in a high-speed sand or glass bead mill until the maximum particle size is 3 microns. To this dispersion are admixed with stirring:

27.8 g glycol
6.0 g dibutylnaphthalenesulphonate
3.0 g sodium pentachlorophenolate and
270.0 g of water After good homogenisation it is filtered. 1000 g of a finely dispersed, fluid, non-sedimentary and storage-stable dyestuff dispersion, lending itself, upon dilution, to the dyeing of wool/polyamide according to usual dyeing procedures, is obtained.

Its viscosity and fluid properties are only slightly changed upon prolonged storage at room temperature. After production $\eta$ = 5.4 cPoise (Casson viscosity)
$fc$ = 37.9 dyn/cm$^2$ (flow limit)

After storage for 5 months:

$\eta$ = 4.9 cPoise
$fc$ = 32.5 dyn/cm$^2$.

The preparation is readily diluted with water, requiring no special mixing equipment for the production of a dye bath.

EXAMPLE 13

To 400 ml of water at 40° C are added 1 ml of 80% acetic acid and 2 g of the liquid dyestuff dispersion of Example 1 without special presolution. 100 g of wool are added to the dye bath. It is heated to boiling over a period of 30 minutes and dyeing is performed at the boiling point (98° C) for 60 minutes. Subsequently, the dye goods are well flushed with water and dried. An orange wool dyeing with very good fastness to light and moisture is obtained.

EXAMPLE 14

To 400 ml of water are added without special presolution, 4 g of the liquid dyestuff preparation of Example 7 as well as 1 ml of 80% acetic acid and 2 ml of a highly-sulphonated castor oil. 100 g of Polyamide-6,6 are immersed in the dye liquor at 30° C the dye bath is heated to boiling in 30 minutes and dyeing is performed for 45 minutes at boiling. Subsequently, the dye goods are flushed with water and dried. A blue-green polyamide dyeing with very good fastness to light and moisture is obtained.

We claim:

1. A fluid and stable anionic dyestuff dispersion having a viscosity of 3 to 500 centipoise comprising as essential components
   (a) 10 to 50% by weight of at least one dispersed anionic dyestuff having a particle size below 5μ;
   (b) 5 to 80%, relative to the amount of dyestuff, as a dispersing agent a mixture selected from the group consisting of:
      (1) sodium lignin sulphonate and disodiumdinaphthylmethane-disulphonate,
      (2) sodium lignin sulphonate and decyloxyacetic acid monoethanolamide, and
      (3) disodiumdinaphthylmethanedisulphonate and sodiumdioctylsulphosuccinate; and
   (c) 20 to 80% by weight of the dispersion of water.

2. A dispersion according to claim 1 which contains an acid wool dyestuff.

3. A dispersion according to claim 1 which contains metal-containing anionic dyestuffs.

4. A stable dispersion according to claim 3 wherein the metal-complex dyestuffs contain an unsubstituted N-mono- or N,N-di-alkyl-substituted sulphonic acid amide group or a low-molecular alkylsulphonyl group.

5. A dispersion according to claim 1 which contains non-metallized anionic dyestuffs.

6. A dispersion according to claim 1 which contains in addition to the dispersing agent up to 5 percent by weight, relative to the weight of the stable dispersion, of dibutylnaphthalene sulphonate.

7. A dispersion according to claim 1 which further contains as an auxiliary agent a humectant, antisedimentation agent, bactericide or combination thereof.

* * * * *